April 9, 1940.   E. BREITLING   2,196,382
ACCOUNTING AND THE LIKE MACHINES
Filed Aug. 5, 1935   5 Sheets-Sheet 1

Inventor
Ernst Breitling
By
Carl Brust
His Attorney

April 9, 1940.  E. BREITLING  2,196,382
ACCOUNTING AND THE LIKE MACHINES
Filed Aug. 5, 1935  5 Sheets-Sheet 2
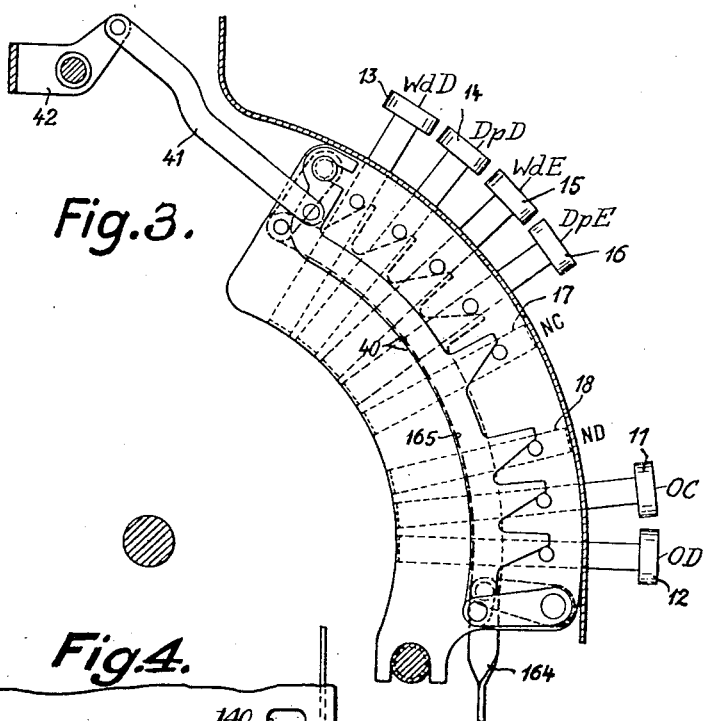
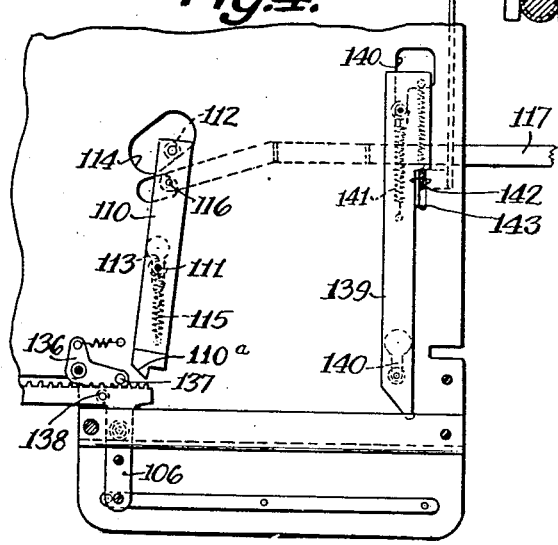
Inventor
Ernst Breitling
By
Ernst Breitling
His Attorney April 9, 1940.  E. BREITLING  2,196,382
ACCOUNTING AND THE LIKE MACHINES
Filed Aug. 5, 1935   5 Sheets-Sheet 3

Inventor
Ernst Breitling
By Carl Beust
His Attorney

April 9, 1940.  E. BREITLING  2,196,382
ACCOUNTING AND THE LIKE MACHINES
Filed Aug. 5, 1935  5 Sheets-Sheet 4
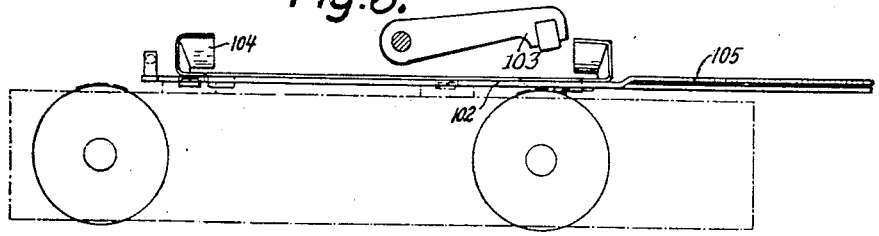
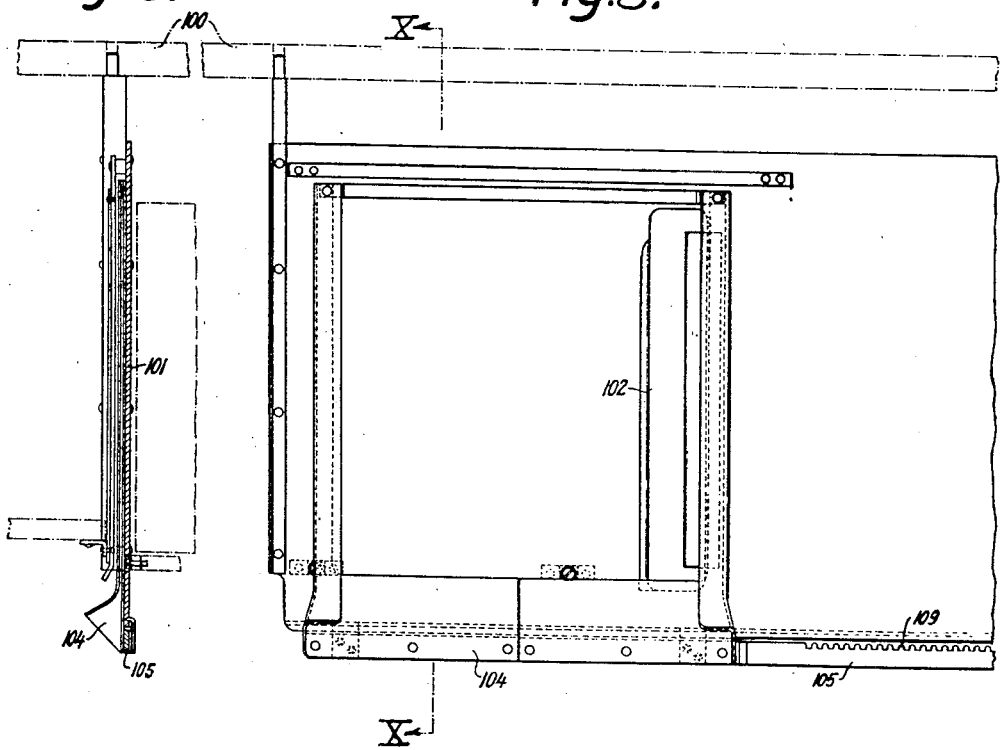
Inventor
Ernst Breitling
By
Earl Bent
His Attorney April 9, 1940.  E. BREITLING  2,196,382
ACCOUNTING AND THE LIKE MACHINES
Filed Aug. 5, 1935  5 Sheets-Sheet 5
Fig. 7.
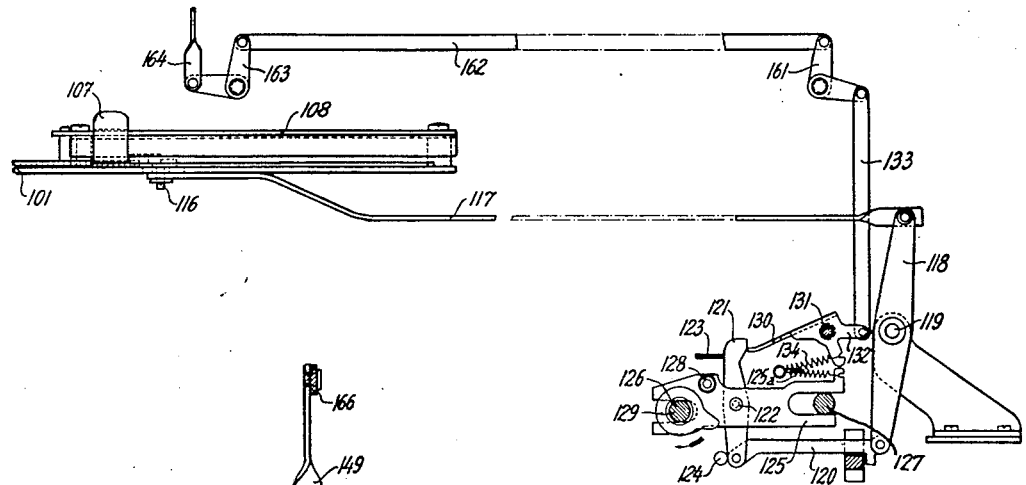
Fig. 9.
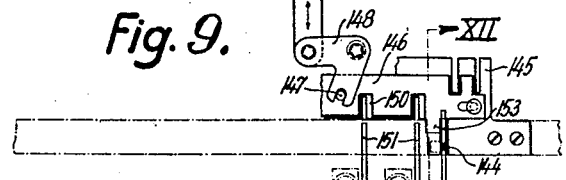
Fig. 12.
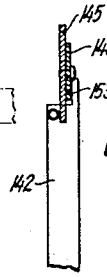
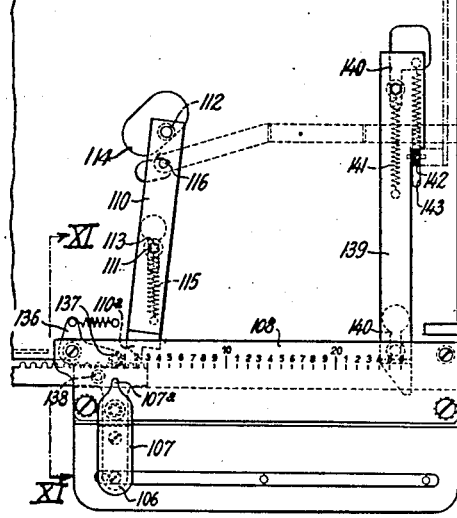
Fig. 11.
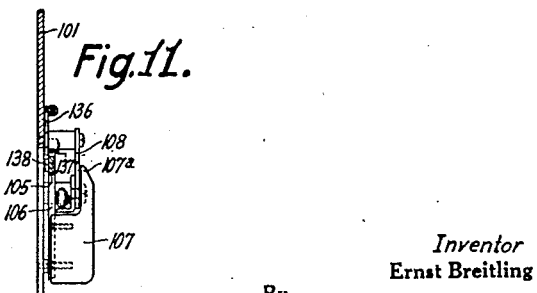
Inventor
Ernst Breitling
By Carl Benst
His Attorney Patented Apr. 9, 1940

2,196,382

UNITED STATES PATENT OFFICE 2,196,382

ACCOUNTING AND THE LIKE MACHINES

Ernst Breitling, Berlin-Tempelhof, Germany, assignor to The National Cash Register Company, Dayton, Ohio, a corporation of Maryland Application August 5, 1935, Serial No. 34,765
In Germany November 12, 1934

7 Claims. (Cl. 197—124)

The invention relates to accounting and the like machines used in banks and other business offices for handling different groups of accounts as customer and business accounts.

An object of the invention is to adapt the printing device of such a machine for properly printing once or several times on record material in accordance with the kind of item entering or balancing operations.

Another object of the invention is to control line spacing in accordance with the transaction set up.

Another object of the invention is to provide means for locking the machine when in tabulating operations the lines of the record material available are exhausted.

Further objects of the invention will be pointed out in the following detailed description with reference to the annexed drawings.

A preferred form of an embodiment of the invention is shown in the annexed drawings.

Of said drawings:

Fig. 3 is a side view of the balance key bank, showing the connection with the automatic line-spacing mechanism.

Fig. 4 is a view of a part of the line-spacing mechanism.

Figure 1:
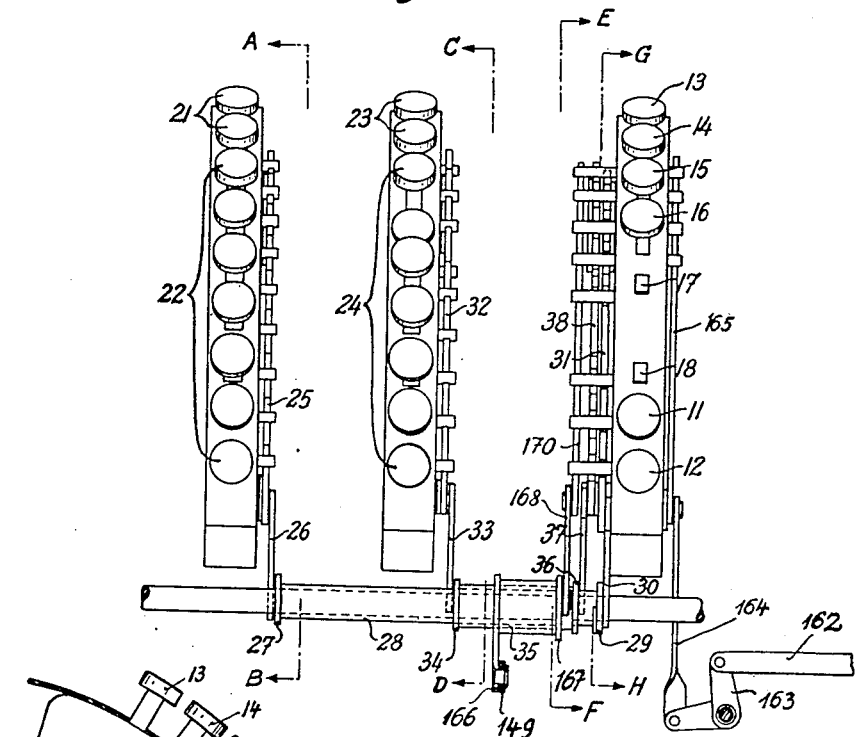
Fig. 1 is a front view showing the control keys and the connection from these keys to the line-spacing mechanism.

Figs. 6 and 7, taken together, show a front view of the upper portion of the printing table with the controls for line-spacing set by a depressed transaction key.

Figs. 8 and 9, taken together, show a top view of the upper portion of the printing table and the automatic line-spacing device.

Fig. 10 is a cross section through the upper printing table along the line X—X of Fig. 8.

Fig. 11 is a detail of the upper printing table taken along the line XI—XI in Fig. 9.

Fig. 12 is a section through the locking mechanism taken along the line XII—XII in Fig. 9.

General description

The printing device, the structure of which may be of any well known type, is particularly adapted according to the invention for making records during various operations of the machine. The two lower printing positions of the printing device function in a well known manner.

Of the two upper printing positions of the printing mechanism, the one is provided for printing in a well known manner upon the audit strip while the other is provided for printing on a business account card, on which, however, are recorded only the amounts of deposits or withdrawals. Since a list contains normally items of the same class and therefore the entries have to be made onto the same business account, all the transactions are printed upon the same business account card. For the proper line spacing of the card, the printing table pertinent to this printing position, is automatically line spaced by the machine drive after each print when it has been moved manually out of its rest position, and set to any desired line.

When the printing table has arrived at its end position after the last line is imprinted, the machine release is locked so that the operator is reminded of the fact that the business account card is to be replaced.

Detailed description

An accounting machine, to which the novel features according to the invention are applied, is shown and described in the copending application, Serial No. 522,053 of March 12, 1931, now United States Patent No. 2,052,444, which issued August 25, 1936, and to which reference may be had for a more detailed description.

The machine is provided with a key board comprising, besides the usual several amount key banks (not shown), one bank each of debit and credit keys of which the keys 21 are associated with the customer debit accounts, the keys 22 with the business debit accounts, the keys 23 with the customer credit accounts, and the keys 24 with the business credit accounts. In addition thereto, the usual keys 11 and 12 are provided for the old credit and debit balances, the blind keys 17 and 18 for the new credit and debit balances, and the transaction keys are duplicated, that is, the keys 13, 14 for transferring amounts from a customer account to a business account, or from a business account to a customer account respectively, and the keys 15, 16 for the transfers from one customer account to another customer account, or from one business account to another business account respectively.

Due to the fact that the transaction keys are duplicated, a key interlocking mechanism (see Fig. 1) is arranged which permits only one transaction key necessary at the time to be depressed.

For this purpose the debit key bank has rockably mounted thereon a detent 25 connected, by means of a link 26, arm 27, sleeve 28, arm 29 and link 30, to a detent 31 arranged in the balance key bank, in such a way that by depressing a debit key 21 or 22 the detent 31 is moved upward. In the same manner a detent 32, associated with the credit keys 23 and 24, is connected by means of the parts 33, 34, 35, 36, 37 to a detent 38 of the balance key bank, so that by pressing a credit key 23 or 24 the detent 38 is moved upward.

The detent 31 is provided with locking projections which, when no debit key is depressed, pass under the pins of the transaction keys 13, 14 and 15 thus locking them against being depressed, while the pin of the key 16 is faced by a radial slot of the detent. If the locking slide 31 is moved upward by depressing a debit key, a locking projection is moved beneath the pin of the key 16, while the pins of the other transaction keys 13, 14 and 15 are faced by radial slots of the detent 31. The detent 38 is formed in a similar manner, which detent in normal position, that means, when no credit key is depressed, locks the transaction keys 13, 14 and 16 by means of its locking projections whereas a radial slot lies opposite the pin of the key 15. If, by depressing a credit key, the detent 38 is moved upward, it releases by means of its radial slots the keys 13, 14 and 16 and locks, now, the key 15. As a consequence of the two cooperating detents 31 and 38 being arranged in the manner described, all of the keys 13, 14, 15, and 16 are held locked as long as neither a debit nor a credit key is depressed. If a credit key 23 or 24 is depressed, the deposit key 16 for single entries is released, as, now, the two detents 31 and 38 are located so that one radial slot each thereof lies opposite the pin of the key 16, while all the other transaction keys are locked. In the same manner, by depressing a debit key 21 or 22, only the withdrawal key 15 for single entries is released. If a debit key and a credit key are depressed, both the detents 31 and 38 are moved upward and, thereby, the two transaction keys 15 and 16 for single entries are locked, and the two transaction keys 13 and 14 for double entries released.

The details of the operations controlled by these keys do not enter into the invention being claimed and will not be described further herein.

Figure 5:
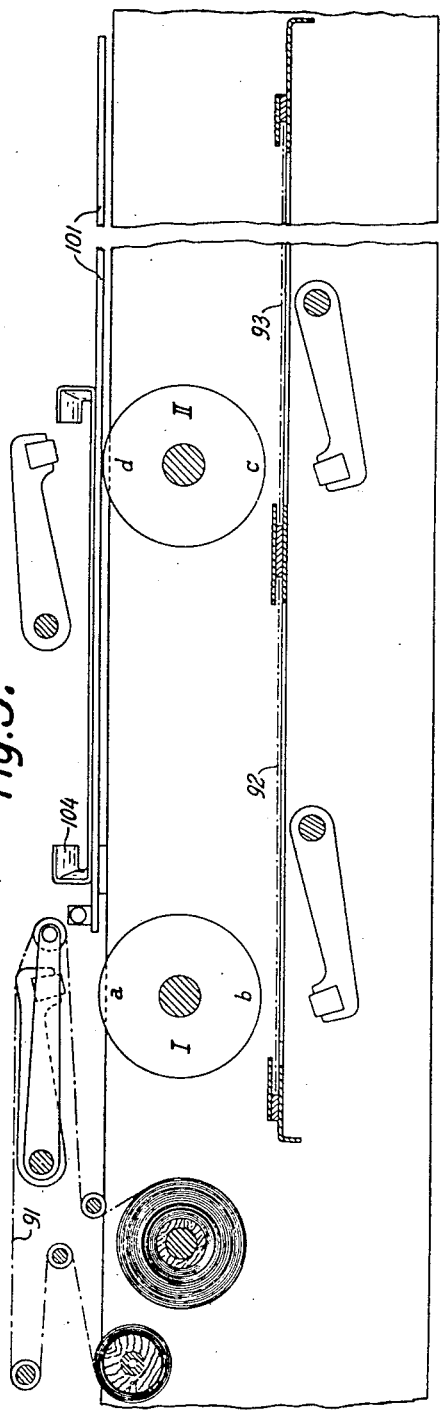
Fig. 5 shows in front view the arrangement of the printer.

A printing device of any well known type is arranged in the machine, being provided with two sets of printing types I and II to print at four printing points *a*, *b*, *c* and *d* (Fig. 5).

At the printing point *a* the audit strip 91 is imprinted so that each single entry (old balance, transaction, new balance) with all the data set up (amount, customer number, transaction character and consecutive number) appears in a separate line. At the printing point *b* the respective customer card 92 is imprinted with all the data of a complete balance entry, and thereby each deposit or withdrawal is recorded and the new balance indicated on the account of the respective customer or depositor. Simultaneously with the print of the customer ledger card the notification 93 or the statement of account for the customer is printed at *c*. When a transaction appertaining to two business accounts is to be recorded, the two lower printing places *b* and *c* are actuated. At *d* only the data belonging to a transaction entry are printed upon the card inserted. When an amount is to be transferred from one customer account to another one, a control voucher is printed at this printing place.

In all the other transactions, in which a business account is concerned, the amount of the transaction is printed upon the ledger card 94 for the respective business account at *d*.

As it is customary to collect for a certain period, say a day, the items to be transferred from customer account to a certain business account, and then to post them successively, the same business account card is employed and the printing table at printing position *d* is adapted for 10 line spacing and provided with an automatic line spacing device, so that the business account ledger card inserted can remain in its position during all the entries to be entered on the respective business account, and is fed automatically from line to line.

For this purpose the printing table at printing position *d* is constructed as now will be described:

The printer frame 100 has secured thereto a stationary plate 101 (Figs. 4 and 6 to 12) having a recess 102 for the printing hammer 103. On this plate a card frame 104 to receive the business account card is arranged to be shifted longitudinally. Fast on the frame 104 is a bar 105 provided with an extension 106. Fast on the said extension is a handle 107 having a pointed end 107a gliding on a scale 108 connected to the stationary plate 101. The bar 105 is provided with a rack 109 adapted to cooperate with a control lever 110. The latter is provided with two rollers 111, 112, the roller 111 being guided in a slot 113 of the plate 101 and the roller 112 engaging a recess 114 of the plate 101. A spring 115 fastened to the roller 111 tends to drag the control lever forward, whereupon the bevelled surface of the recess 114, cooperating with the roller 112, tends to impart to the control lever a short counter-clockwise movement. Initially, this is prevented because a pin 116 of the control lever is engaged by a rod 117 having its other end linked to a two-armed lever 118 pivoted at 119 and connected by a link 120 to a lever 121 mounted on a stud 122 and, normally, engaging above and below, under the action of a spring 125a, stationary stops 123 and 124 respectively. The stud 122 is provided on a slide 125 shiftably supported by the shafts 126 and 127. Slide 125 is provided with a roller 128. A cam 129 secured to the shaft 126, performing a full revolution in clockwise direction during each machine operation, cooperates with the roller 128 and moves the slide 125 by a certain space to the right. Also a locking means is arranged so as to engage from the right hand side the upper arm of the lever 121. This locking extension consists of a flap 130 rotatably mounted on a shaft 131 and provided with an arm 132 pivotally connected to a rod 133. This rod 133 is connected by a linkage 161 to 164 to a detent 165 (Figs. 3 and 7) cooperating by its bevel surface with the transaction keys 13 to 16 in such a manner that by depressing one of these transaction keys it is moved downward. The flap 130 connected with said detent 165 is moved thus opposite the upper portion of the lever 121, while when no transaction key is depressed, the said flap 130 is held by a spring 134 out of the path of the lever 121.

Thus, when due to the fact that no transaction key is depressed, the flap 130 is outside of the path of the lever 121, this lever is driven by the slide 125 and rocked clockwise about 122. Thus the linkage 120, 118, 117, 110 is not moved.

When, however, upon depressing one of the transaction keys 13 to 16 the flap 130 is moved opposite the lever 121, the upper end of the latter, when the slide 125 is driven, is rocked counter-clockwise, and thereat by the linkage 120, 118, 117 the lever 110 counter-clockwisely about the pin 111. During this movement of the lever its pivotal point 111 is moved in the slot 113 outward under the action of the spring 115 and of the inclined surface of the recess 114, so that the feed nose 110a of the lever 110 engages the rack 109 and advances it. If the card frame 104 with the rod 105 and the pointer 107 are in their normal positions shown in Figs. 4 and 9, this control movement of the lever 110 does not have any effect, as no tooth of the rack 105 lies in the path of the feed nose 110a.

The printing table is set to rest position whenever, in connection with a single entry only, a single line of a record material is to be imprinted, that is, when the table remains always in the same position. A spring actuated locking lever 136 is pivoted to the stationary plate 101 and provided with a roller 137 entering the gap between two teeth of the rack 105 and thus holding the printing table in the respective position set to.

If the printing table is adjusted by hand to the first or any other line desired, the teeth 109 of the rack 105 are moved in the path of the feed nose 110a, so that when the lever 110 during the following transaction is moved in the manner set forth above, its feed nose strikes a tooth of the rack 105 and shifts the card frame 104 by one tooth to the right. This line spacing is effected at each transaction, the data of which are printed upon a separate line of the business account card inserted.

Figure 2:
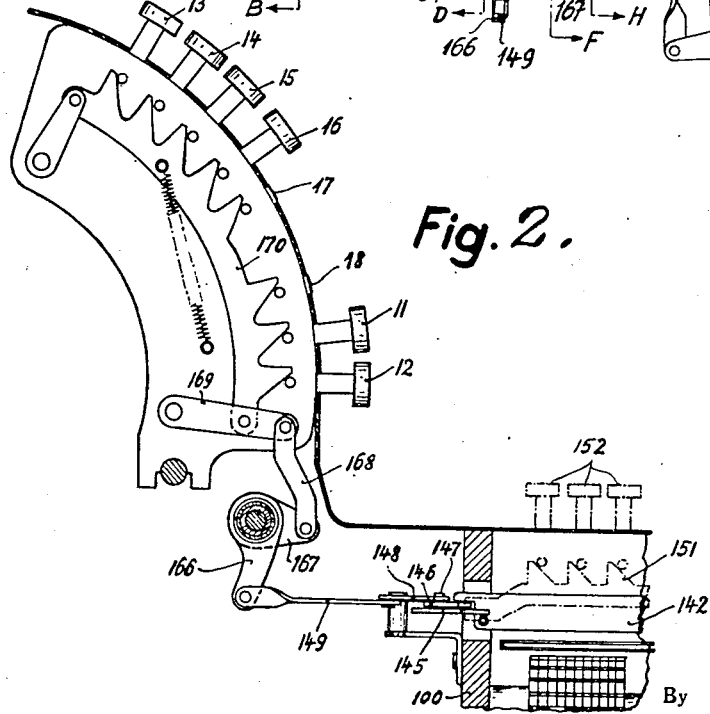
Fig. 2 is a side view of the balance key bank, showing the connection between this bank and the ledger keyboard.

If the printing table has reached the last line (i. e., for instance the 26th), the table, after this line is imprinted, is still advanced by one line. In so doing, a roller 138 on the rack 105 strikes the bevelled end of a slide 139 arranged to be shifted in two elongated slots 140 of the stationary plate 101, and held by a spring 141 in its forward position. The slide 139 is connected to a second slide 142 the ends thereof, respectively, being guided in a slot 143 of the plate 101 and in a slot 144 of a stationary plate 145. The plate 145 has attached thereto a locking slide 146 adapted to be shifted longitudinally and provided with a pin 147 engaged by the one arm of a bell crank lever 148 the other arm of which is connected to a link 149. This link is connected by a linkage 166 to 169 to a detent 170 (Figs. 1, 2, and 9) the bevel surfaces of which cooperate with the transaction keys 11 to 18 serving as release keys, in such a way that by depressing one of those release keys the slide 146 is moved to the right.

The slots 150 provided in the slide 146, enable detents 151 of the ledger key banks to rock, which movement is imparted to them by account number or ledger keys 152 depressed. However, as soon as the slide 146, upon depression of a release key, has been moved to the right, the detents 151 are faced by locking surfaces instead of gaps, so that they can not move any further, that is, no account keys can be depressed or released, before the release key is released at the end of the machine operation. This movement of the slide 146 is used also in connection with the slide 142. For this purpose the slide 146 has an extension 153 positioned, by depressing a release key, in the path of the slide 142 and moved out of the path of the slide 142 when the slide 146 returns. If, now, when the last line is passed, the slide 139 and in connection therewith the slide 142 is moved inward by means of the roller 138, the forward portion of the slide 142 comes into the path of the extension 153 thus preventing the slide 146 from moving to the right, whereby also the machine release is prevented. That the last line of the business account card has been imprinted and a fresh card has to be inserted, is called to the operator's attention.

While the form of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a machine of the class described, the combination of a mechanism for printing on a record material, a shiftable table for supporting said record material, normally idly operating means ineffective to shift said table to line space the record material, a plurality of control keys, and means actuated by the item entry control keys and cooperable with the shifting means to prevent the idle operation of the shifting means to render the shifting means effective to shift the table.

2. In a machine of the class described, the combination of a bank of control keys including keys allotted to two kinds of operations, a printing means for recording data on record material, a shiftable support for said record material, means for line spacing said support including a power-operated element operated during each machine operation, and means actuated by the control keys allotted to one kind of operation for controlling the operation of the element to render the line spacing means operative during said one kind of operation of the machine; said control keys allotted to the other kind of operation being ineffective to actuate said means which controls the operation of the element, to thereby cause the line spacing mechanism to be inactive in said other kind of operation.

3. In a machine of the class described, the combination of a control member, a printing mechanism for printing on a record material, a shiftable support for said record material and normally occupying a home position, normally inoperative means for shifting said support to line space the record material, means controlled by the control member to render the shifting means operable, means to move the support out of its home position to render the shifting means effective thereon, and means rendered effective by the support, when it is shifted to a predetermined position, to prevent the operation of the control member.

4. In a machine of the class described, the combination of a machine release key, a lock for said key, a printing mechanism for printing on a record material, a shiftable support for said record material, means to line space the support, and means actuated by the support to move the locking means to lock the key when the support has moved the record material past the last printing line, to retain the locking means effective while the support is in said position, and to release the locking means for the key as soon as the support is moved out of said position.

5. In a machine of the class described having means to print on record material, the combination of shiftable means for supporting record material for movement relative to said printing means; means, including a pivoted pawl, for shifting said support; an element shifted during each machine operation; a member pivoted intermediate its ends to the element and having one end connected to the pawl; and blocking means movable into engagement with the other end of the member to cause the member to rock the pawl when the element is shifted.

6. In a machine of the class described having printing means and control keys, the combination of shiftable means for supporting record material for movement relative to the printing means; a member engageable with said support to shift the support to line-space the record material; a power-driven slide operated in each machine operation; an element pivoted intermediate its ends to said slide and having one end connected to the member and the other end free, said element, when the slide is operated, normally pivoting about the end which is connected to the member; and blocking means, moved into blocking relation with the free end of said element by certain of said control keys, to cause the element, when the slide is operated, to pivot about the end which is blocked, to thereby cause the member to be operated to shift the record material supporting means.

7. In a machine of the class described, the combination of control devices; printing means; means for supporting record material for movement relative to said printing means; means controlled by said control devices for shifting the support to line-space the record material, said shifting means being operable after the printing means has operated in a machine operation; and locking means for the control devices, including a member shifted to blocking position by the supporting means when it is line-spaced following a printing operation on a predetermined line on the record material, said member remaining in blocking position until the supporting means is moved from its last-mentioned position.

ERNST BREITLING.

CERTIFICATE OF CORRECTION.

Patent No. 2,196,382.   April 9, 1940.

ERNST BREITLING.

It is hereby certified that error appears in the printed specification of the above numbered patent requiring correction as follows: Page 3, second column, line 23, claim 1, for the words "the item entry" read --certain of the--; and that the said Letters Patent should be read with this correction therein that the same may conform to the record of the case in the Patent Office.

Signed and sealed this 4th day of June, A. D. 1940.

(Seal)

Henry Van Arsdale,
Acting Commissioner of Patents.